United States Patent
Del Nobile

(10) Patent No.: US 8,256,895 B2
(45) Date of Patent: Sep. 4, 2012

(54) PROGRESSIVE MULTIFOCAL OPHTHALMIC LENSES IDENTICALLY OPTIMIZED OVER A WIDE RANGE OF REFRACTIVE INDICES, BASE CURVES, AND ADDITIONS

(75) Inventor: Mauro Del Nobile, Peseux (CH)

(73) Assignee: Swissphonics SA, Sarnen (CH)

( * ) Notice: Subject to any disclaimer, the term of this patent is extended or adjusted under 35 U.S.C. 154(b) by 112 days.

(21) Appl. No.: 12/918,215

(22) PCT Filed: Feb. 17, 2009

(86) PCT No.: PCT/CH2009/000063
§ 371 (c)(1),
(2), (4) Date: Nov. 17, 2010

(87) PCT Pub. No.: WO2009/103175
PCT Pub. Date: Aug. 27, 2009

(65) Prior Publication Data
US 2011/0051081 A1 Mar. 3, 2011

(30) Foreign Application Priority Data
Feb. 20, 2008 (CH) ........................... 0235/08

(51) Int. Cl.
*G02C 7/06* (2006.01)

(52) U.S. Cl. .................. 351/159.42; 351/159.06

(58) Field of Classification Search ............. 351/168, 351/169, 171, 159.06–159.07, 159.41–159.43
See application file for complete search history.

(56) References Cited

U.S. PATENT DOCUMENTS

| | | |
|---|---|---|
| 3,687,528 A | 8/1972 | Maitenaz |
| 3,711,191 A | 1/1973 | Tagnon |
| 3,910,691 A | 10/1975 | Maitenaz |
| 4,055,379 A | 10/1977 | Winthrop |
| 4,315,673 A | 2/1982 | Guilino et al. |
| 4,606,622 A | 8/1986 | FueGerhard et al. |
| 4,838,674 A | 6/1989 | Dufour |
| 4,946,270 A | 8/1990 | Guilino et al. |
| RE34,132 E | 11/1992 | Kitani |
| 5,270,745 A | 12/1993 | Pedrono |

(Continued)

FOREIGN PATENT DOCUMENTS
GB 2206978 A 1/1989
(Continued)

*Primary Examiner* — Darryl J Collins
(74) *Attorney, Agent, or Firm* — The Webb Law Firm

(57) ABSTRACT

The invention relates to so-called progressive medical eyeglass lenses. A progressive lens is a type of lens for making eyeglasses for correcting human vision defects, being adapted simultaneously to far vision and to near vision. The present invention makes it possible to reconcile a design that is finely optimized over a wide range of variables; it enables the looked-for optical powers to be made for any progressive lens prescription while controlling and obtaining a distribution of virtually identical optical values on the entire surface of the lens, and doing so for a wide range of materials (i.e. of refractive indices) e.g. lying in the range 1.498 to 1.74 (values mentioned here in non-exhaustive manner), and for any combination of refractive index, of basecurves lying in the range 0.5 diopters to 10.5 diopters, and for any addition values, over an addition range of 0.5 diopters to more than 3.5 diopters. This design presents exceptional "robustness", thereby eliminating the major obstacle of conventional progressive lenses that present characteristics that vary strongly and that depend strongly on the selected materials, basecurves, and additions.

3 Claims, 7 Drawing Sheets

U.S. PATENT DOCUMENTS

Figure 8:
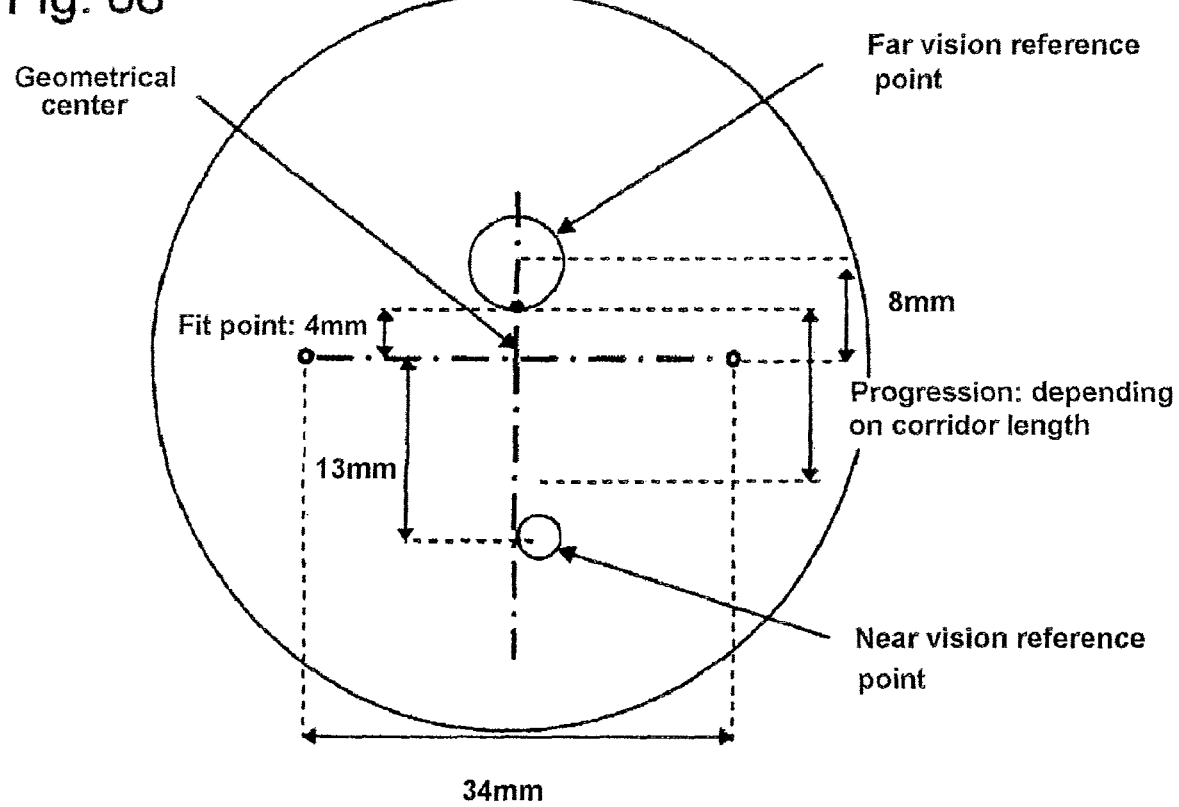

| | | | |
|---|---|---|---|
| 5,272,495 | A | 12/1993 | Pedrono |
| 5,488,442 | A | 1/1996 | Harsigny et al. |
| 5,506,630 | A | 4/1996 | Ueno et al. |
| 5,510,860 | A | 4/1996 | Ueno et al. |
| 5,523,807 | A | 6/1996 | Umeda et al. |
| 5,557,348 | A | 9/1996 | Umeda et al. |
| 5,666,184 | A | 9/1997 | Umeda et al. |
| 5,784,144 | A | 7/1998 | Kelch et al. |
| 5,854,669 | A | 12/1998 | Altheimer et al. |
| 5,861,935 | A | 1/1999 | Morris et al. |
| 5,880,810 | A | 3/1999 | Altheimer et al. |
| 5,892,565 | A | 4/1999 | Ueno et al. |
| 5,949,519 | A | 9/1999 | Le Saux et al. |
| 5,992,998 | A | 11/1999 | Pfeiffer et al. |
| 6,102,544 | A | 8/2000 | Baudart et al. |
| 6,142,627 | A | 11/2000 | Winthrop |
| 6,186,626 | B1 | 2/2001 | Francois et al. |
| 6,220,705 | B1 | 4/2001 | Francois et al. |
| 6,302,540 | B1 | 10/2001 | Katzman et al. |
| 6,318,859 | B1 | 11/2001 | Baudart et al. |
| 6,343,861 | B1 | 2/2002 | Kris et al. |
| 6,412,947 | B2 | 7/2002 | Yanari |
| 6,540,354 | B2 | 4/2003 | Chauveau et al. |
| 6,652,096 | B1 | 11/2003 | Morris et al. |
| 6,709,106 | B2 | 3/2004 | Kelch et al. |
| 6,712,467 | B1 | 3/2004 | Kitani |
| 6,776,487 | B2 | 8/2004 | Haimerl et al. |
| 6,779,889 | B2 | 8/2004 | Welk et al. |
| 6,808,263 | B2 | 10/2004 | Welk et al. |
| 6,832,834 | B2 | 12/2004 | Haimerl et al. |
| 6,834,957 | B2 | 12/2004 | Welk et al. |
| 6,848,788 | B2 | 2/2005 | Welk et al. |
| 6,953,248 | B2 | 10/2005 | Sato et al. |
| 7,033,023 | B2 | 4/2006 | Steele et al. |
| 7,066,597 | B2 | 6/2006 | Miller et al. |
| 7,207,675 | B1 | 4/2007 | Chauveau et al. |
| 7,334,893 | B2 | 2/2008 | Altheimer et al. |
| 2002/0196410 | A1* | 12/2002 | Menezes .................. 351/168 |
| 2007/0008489 | A1 | 1/2007 | Guillous et al. |
| 2007/0121063 | A1 | 5/2007 | Bourdoncle et al. |

FOREIGN PATENT DOCUMENTS

GB  2273369 A  6/1994

* cited by examiner

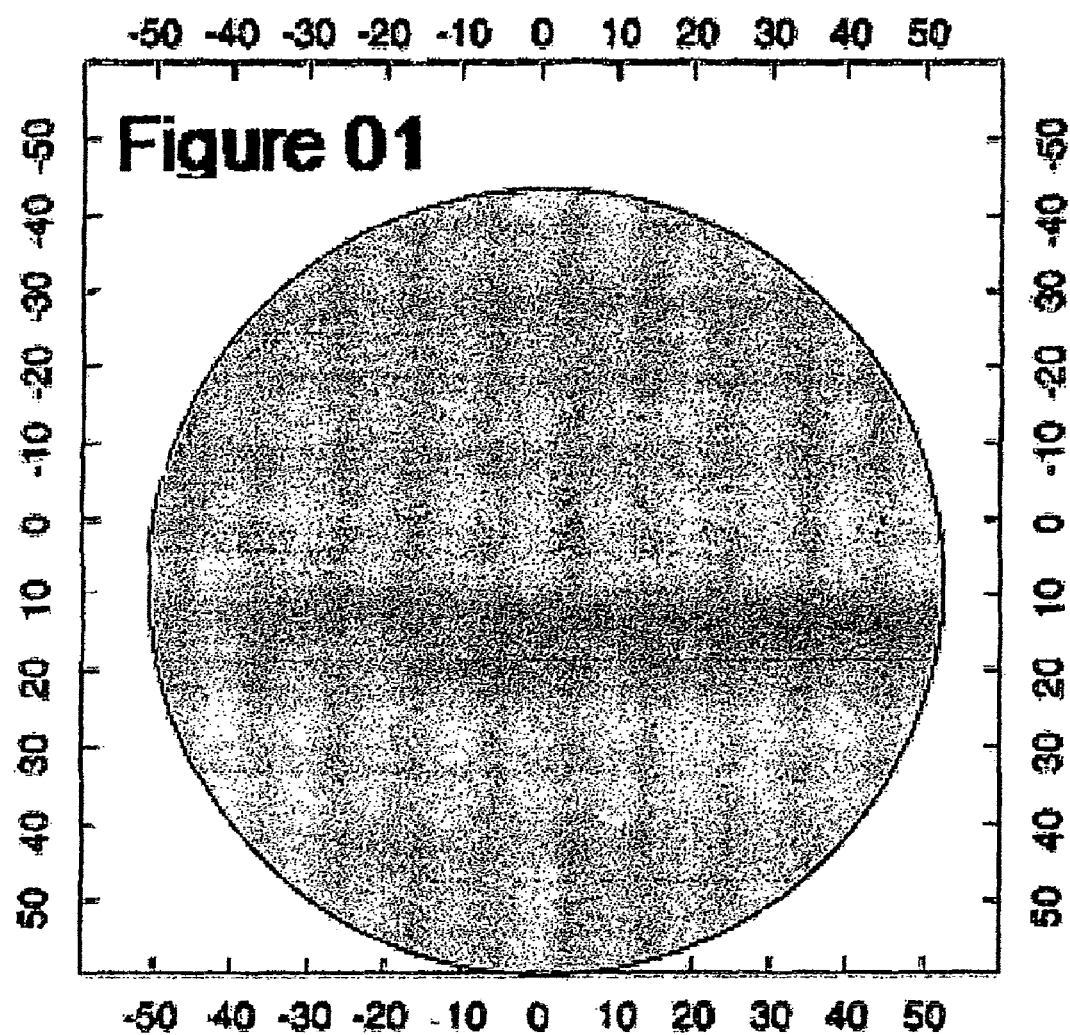

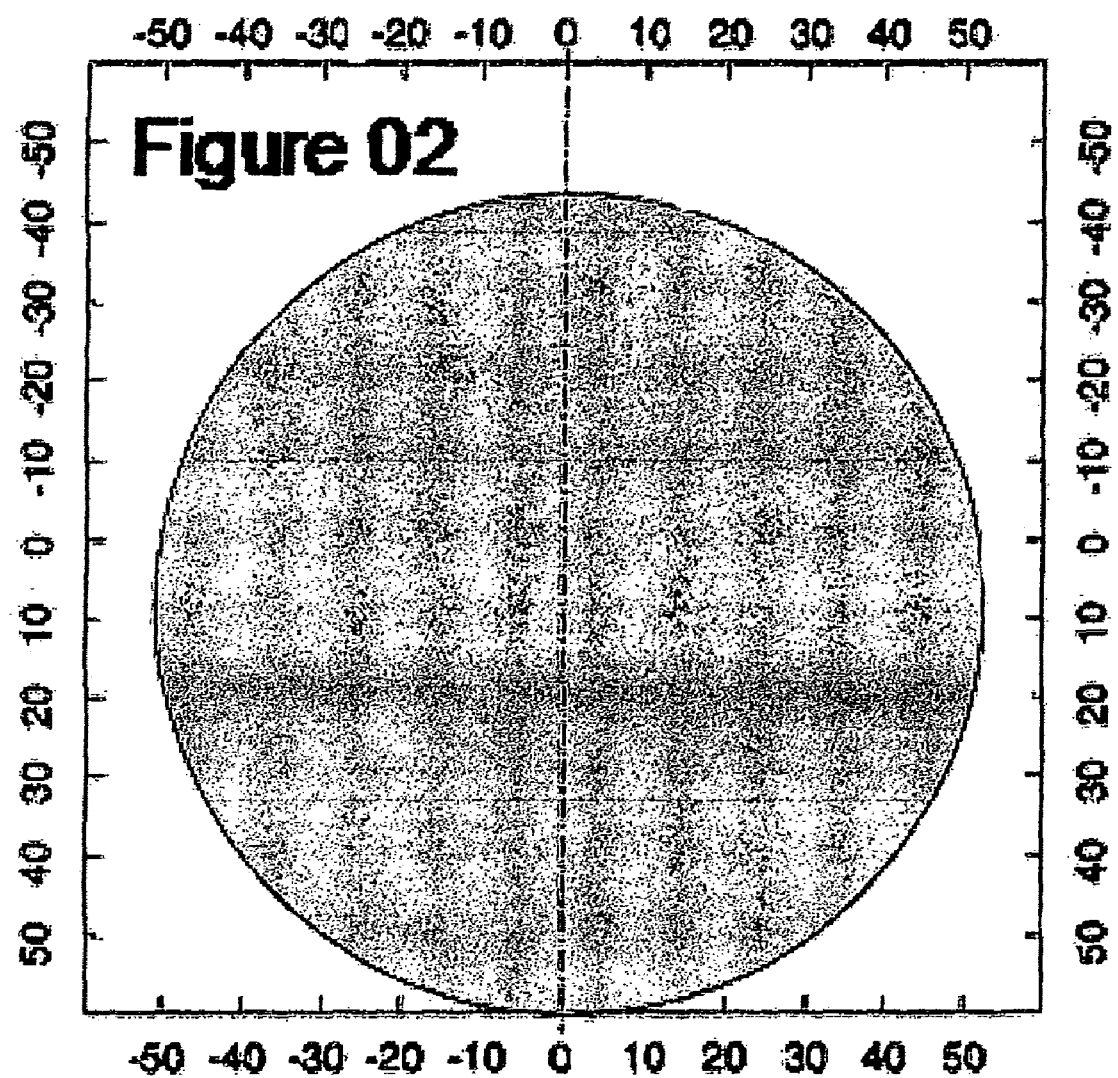

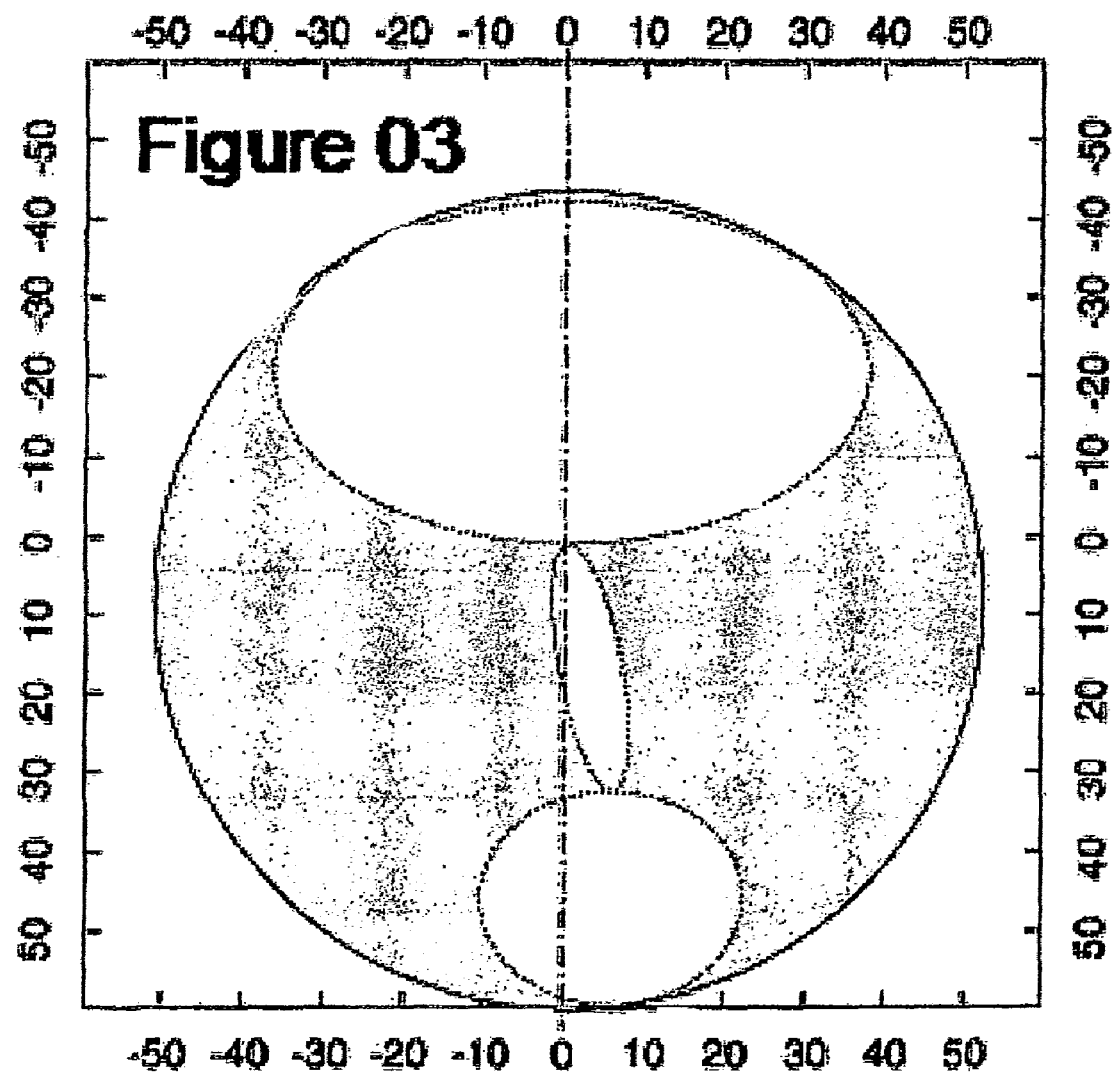

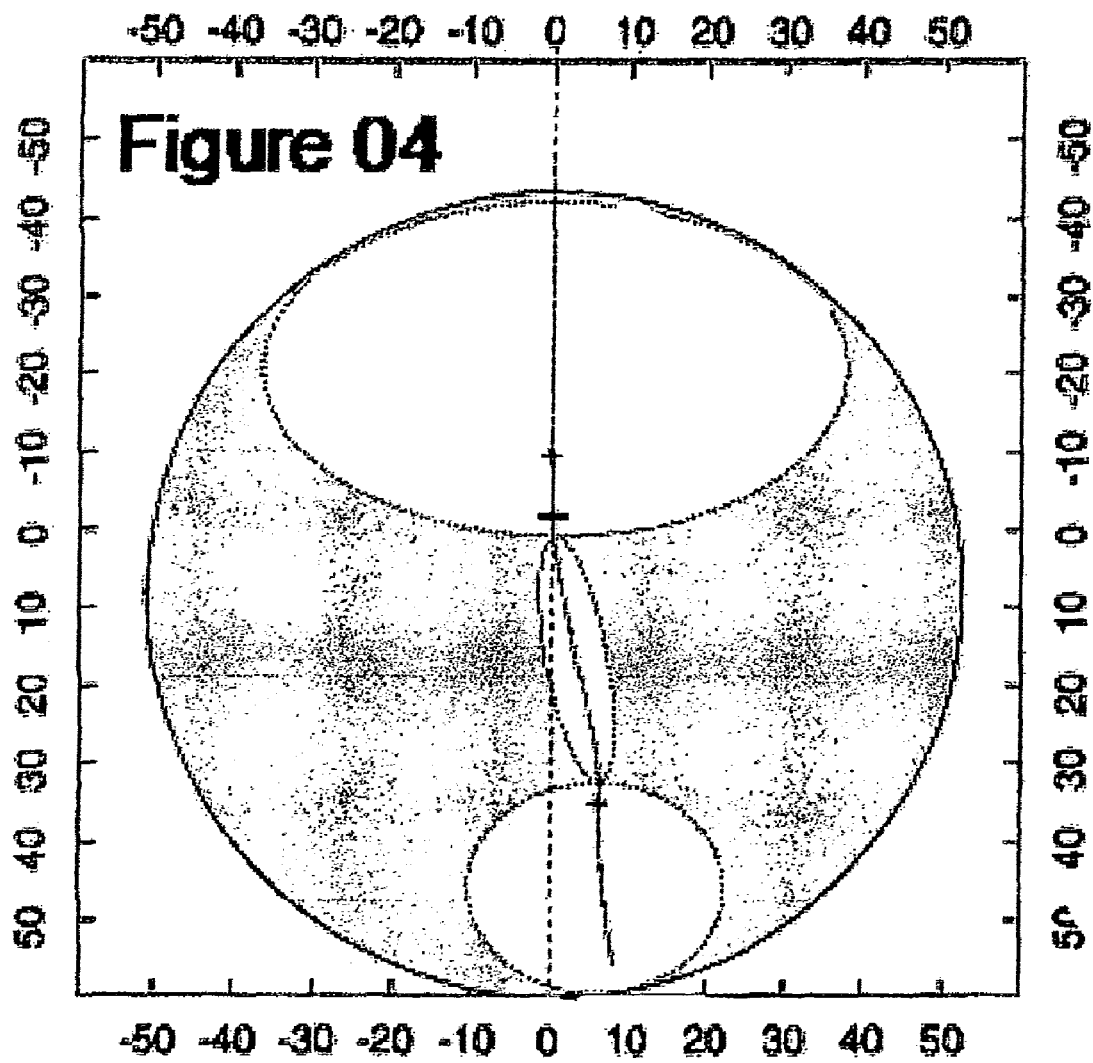

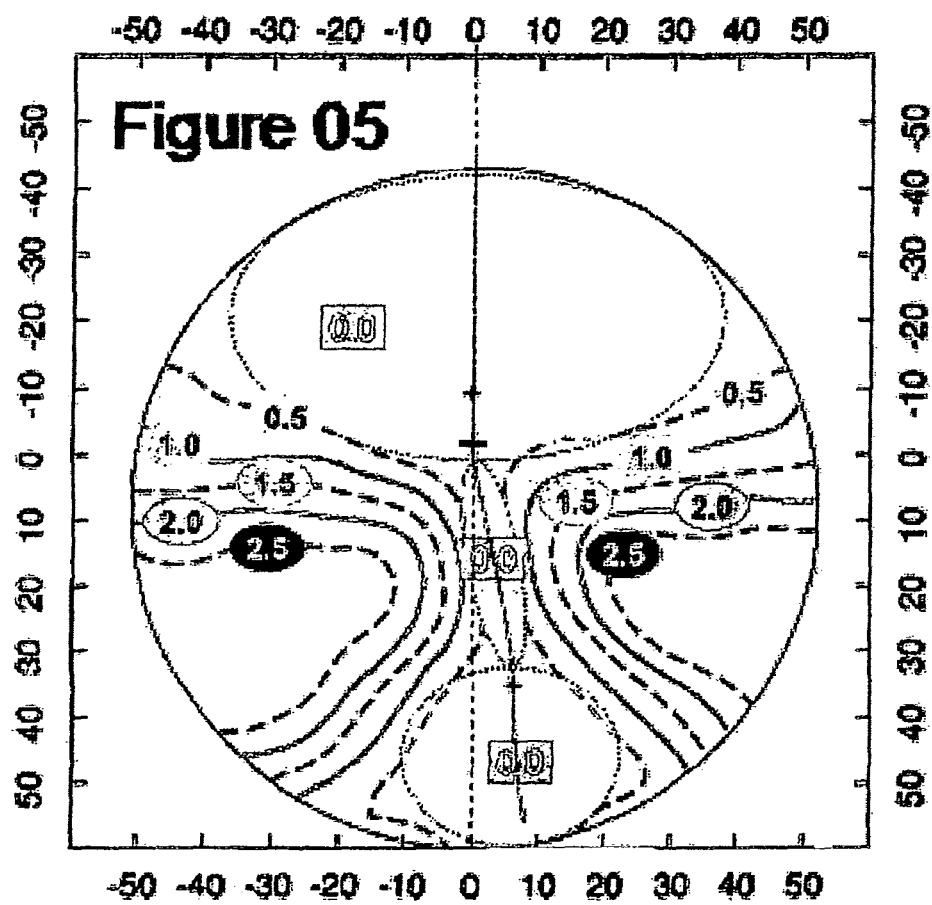
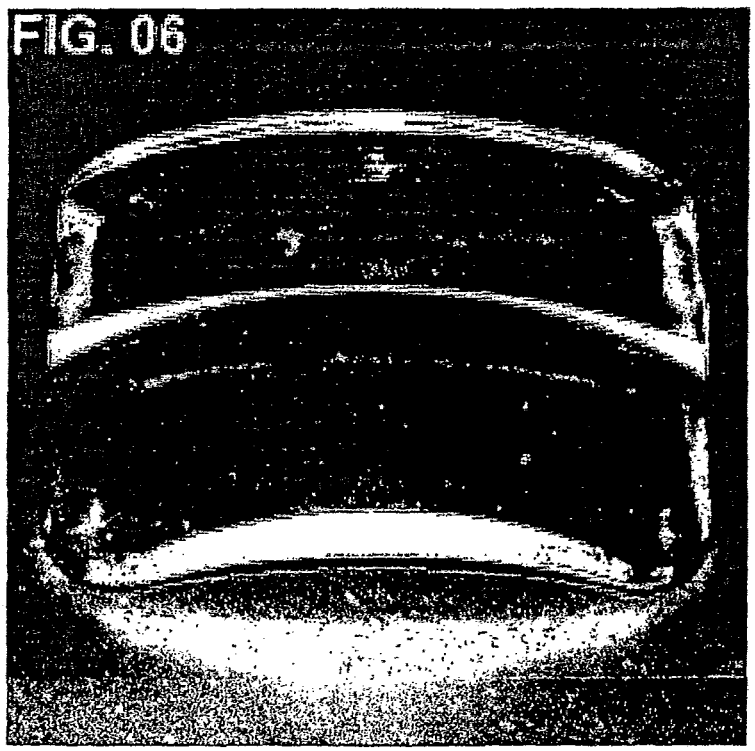

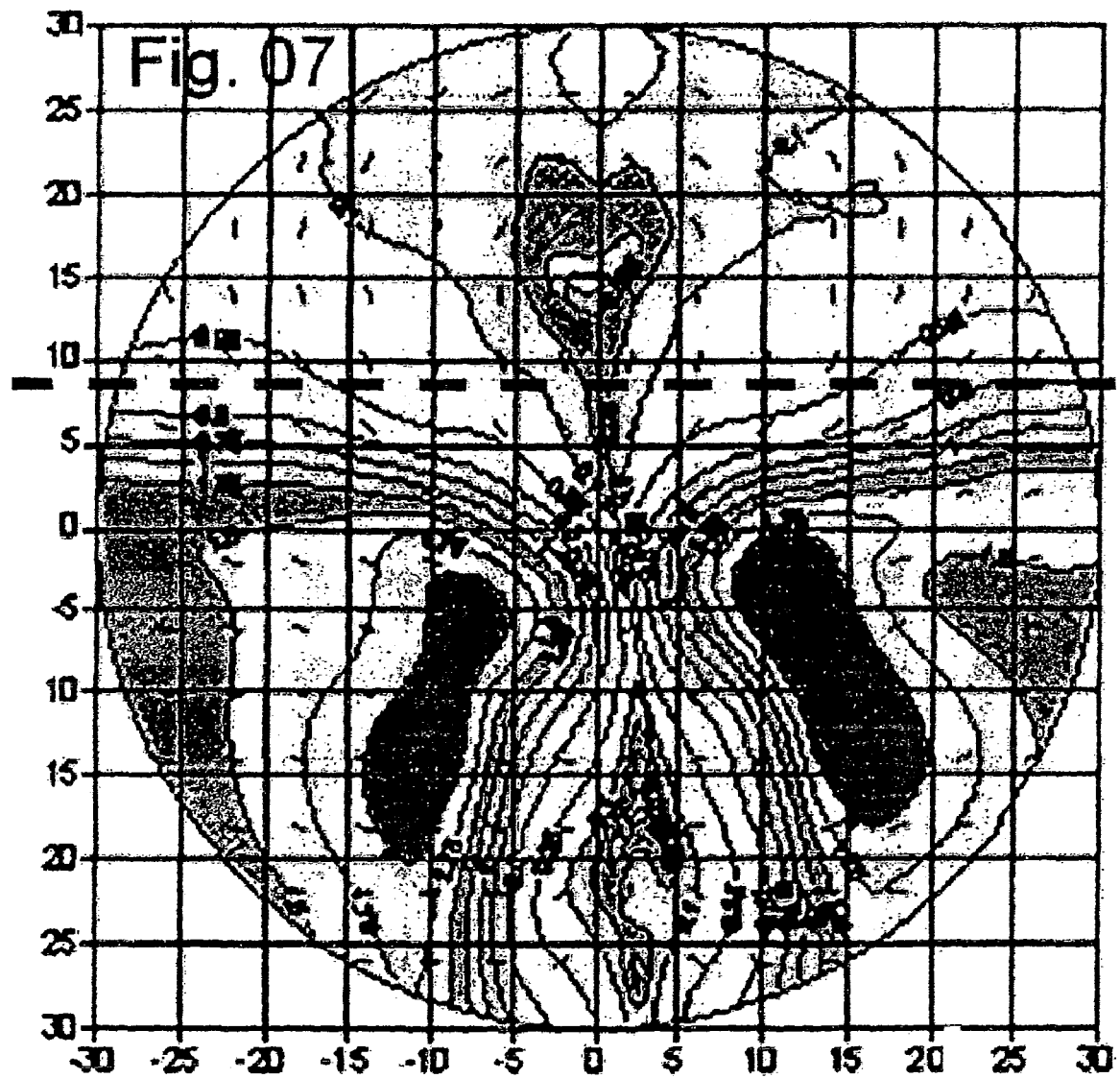

PROGRESSIVE MULTIFOCAL OPHTHALMIC LENSES IDENTICALLY OPTIMIZED OVER A WIDE RANGE OF REFRACTIVE INDICES, BASE CURVES, AND ADDITIONS

TECHNICAL FIELD

Progressive lenses constitute a version of medical eyeglasses having optical power that varies progressively, having simultaneously zones that are adapted to far and near vision (shown in FIG. 03, and in FIG. 04 with its meridian), unlike a unifocal lens or conventional lens (shown in FIGS. 01 and 02 with its meridian) having optical power that is practically constant at all points of its surface.

A present-day progressive lens has a plurality of vision zones, while presenting no surface discontinuity: a far vision zone in the top half of the lens, and a near vision zone in the bottom half of the lens.

The subjects concerned are any individuals whatever their vision characteristics (normal vision, myopia, hypermetropia, astigmatism, or any combination of these various vision families). On average around age forty, everybody suffers another vision peculiarity known as "presbyopia". In fact, this begins at birth: the crystalline lens, which is the portion of the eye that has the ability for accommodation ("focusing"), is no longer vascularized after birth and as a result behaves rather like a tree trunk, accumulating layers as time progresses, thereby causing it to harden and to lose its flexibility; furthermore, ultraviolet light contained in natural light contributes to this irreversible degradation.

STATE OF THE ART

Manufacturers of progressive lenses explain, (in particular if reference is made to the following patents:
FR 2 058 499, see FIGS. 11, 12, 13; FR 2 617 989, see FIGS. 5 and 6; FR 2 683 642;
FR 2 683 643; FR 2 699 924, FIGS. 6, 7, 8, 9; FR 2 753 805, FIG. 15; FR 2 788 861, FIGS. 6 and 7; U.S. Pat. No. 3,711,191; U.S. Pat. No. 3,910,691; U.S. Pat. No. 4,055,379; U.S. Pat. No. 4,315,673; U.S. Pat. No. 4,606,622; U.S. Pat. No. 4,946,270; U.S. Pat. No. 5,270,745; U.S. Pat. No. 5,488,442; U.S. Pat. No. 6,832,834 B2; U.S. Pat. No. 5,784,144; U.S. Pat. No. 5,949,519; and U.S. Pat. No. 6,302,540 B1; coming from world leaders in optics specialized in progressive lenses), that progressive lenses comprise "vision zones" that are generally referred to as the far vision zone and the near vision zone, with an intermediate zone between them (see "vision zones" in FIG. 03). The top portion of the lens is used by the wearer of the eyeglasses for looking in the distance, this is thus the far vision zone; the bottom portion of the lens is used by the wearer for reading or for looking close to, this is thus the near vision zone. Between the far and near vision zones, there is a zone referred to as the intermediate zone, the transition zone, or indeed the "corridor". The progression meridian is a virtual line along which the gaze of the wearer of the eyeglasses sweeps when looking from high to low and straight ahead, i.e. through the center of the lens, which meridian thus passes through the three vision zones; in order to enhance accommodation when reading nearby, the near vision zone is off-center (towards the nose of the wearer for each lens), regarding the meridian (see FIG. 04, vision zones and meridian with the off-center axis for the near vision zone). Because each of these vision zones represents only a fraction of the lens, it is necessary specifically to calibrate the positioning of the eyeglass lenses relative to the gaze of the wearer so as to optimize the "coupling" between the eye and the eyeglass lens; to do this, the vision zones are given reference points, known as "FV" for far vision, with the other usual reference point being the point "NV" for near vision, the "fit point", etc., where the names and positions of these references are defined in FIG. 08.

Progressive lenses made using present-day techniques are highly imperfect, since they inevitably give rise to important undesirable optical consequences that make them difficult to accept by a young wearer of progressive lenses, in particular they have a far vision zone that presents variations in correction of up to 0.25 diopters (dpt) between the center and the periphery of the lens in this zone, and above all a near vision zone that is reduced to a single small portion of the bottom part of the lens; the difference in optical power between these two zones is known as the "addition", with the transition between these two zones nowadays being characterized by a single small corridor of good correction (and thus of good vision). Nowadays, the far vision and near vision zones include places where the optical power values are distorted, with an error of as much as several diopters compared with the ideal looked-for values, between one point and another on the lens that are spaced apart by only a few millimeters; and this applies to all types of corrections and additions, with strong progression corrections having optical defect values that are greater and more marked. These major and unavoidable defects presently characterize all brands specialized in progressive lenses. This is the situation in the state of the art.

A geometrical theorem put forward by the German mathematician G. Minkwitz in 1961 is indeed often cited as a reference by experts on progressive lenses; it sets out in detail the limits on and the consequences of making progressive lenses based on the defined general concept that remains unchanged to this day: consider two spherical portions of different radii meeting tangentially at their meridian, with an "overlap zone" for connecting them to avoid surface discontinuity (for a concise and detailed explanation see: "State of the art—summary", below).

For the wearer of eyeglasses, these large zones in which optical correction is inadequate give rise to static and dynamic disturbances to vision, greatly reducing the zones in which vision is sharp, which zones are thus limited to two small zones for intermediate and near vision, and to the somewhat larger but still imperfect zone for far vision, as shown in FIG. 04.

As a general result of this problem, the wearer of eyeglasses ends up having vision that is good (sharp) on only a small fraction of the progressive lens, thus naturally giving rise to permanent awkwardness and discomfort, and giving the wearer of impression of pitching when turning the head from one side to the other.

In order to compensate this problem and attempt to see clearly, the wearer is obliged to reduce the mobility of the eyes and instead turn the head more, thereby further adding to discomfort, with the pitching effect nevertheless continuing to be present, since it is not possible to attenuate it by changing the vision axis of the eyes.

These defects concerning inappropriate optical power become worse as a function of increasing the power of progression (or addition) of the lens, i.e. the difference in correction between the far vision zone and the near vision zone—with this further aggravating the discomfort of the wearer of eyeglasses having a stronger progression correction (since the problem of presbyopia becomes worse with age, it requires larger addition or progression values as time wears on).

The surface area of a lens used for vision by a wearer is thus limited by these zones in which optical power is inappropriate, and these zones constitute a large portion of the area of progressive lenses.

These zones of inappropriate optical power correspond to non-linearity or deformation produced by the lens, with the value of the correcting optical power ending up being substantially different from the looked-for value; error values of 2.5 diopters are common in these "inappropriate" lateral zones of the lens, and such an error value is very significant: for reference, myopia with a value of 2.5 diopters corresponds to visual acuity of little more than $\frac{1}{10}$.

These inappropriate optical values are mentioned by way of example, since the correction values applied to the lens are naturally specific to each wearer and have a direct influence on a case-by-case basis on the magnitudes of these defects, with this type of defect nevertheless and without exception being a common feature of all present-day progressive lenses. These defects represent a large area of the lens in which the correction obtained is very far from the desired optimum nominal correction, zones in which the inappropriate values always increase on either side of the meridian going towards each lateral edge of the lens. These inappropriate zones are usually represented by so-called "iso-power" and "iso-astigmatism" lines (FIG. 05), in which each line plots a given value for variation in optical power, the lines thus defining zones of variations of the optical values on the surface of the lens; the quantity of these curves depends on the resolution (scale) used for measuring these variations.

As can be seen in FIG. 05, these zones are generally not symmetrical on either side of the meridian, because of the above-mentioned deliberate off-centering of the near vision zone, so that it lies on the convergence axis of the eyes when looking at something nearby (each eye looking at the same point, so the eyes need to converge more when looking at nearer points).

STATE OF THE ART

Summary

To summarize the state of the art, the surface of a present-day or "conventional" progressive lens has two spherical zones: in the top half for "far vision" there is a zone of radius RMax, and in the bottom half for "near vision" there is a zone of radius RMin. Given the difference between these two radii RMax and RMin, and in order to avoid creating any discontinuity or "jump" between these two spherical portions, an "overlap" or transition surface connects these two spherical zones together (otherwise the lens would present discontinuity that increases on going from the meridian to each lateral edge of the lens, as in old-fashioned bifocal lenses, see FIG. 06). Because of this design using "two interconnected spherical portions", the overlap between the top spherical portion and the bottom spherical portion is adjusted in a manner that is not constant and that cannot be constant (as defined explicitly by the mathematician G. Minkwitz in his 1961 theorem), since the difference in radius between the two spherical surfaces means that the adjusting connection (overlap) changes continuously from the meridian to each of the lateral edges of the lens, and it is precisely this continuous variation in the transition between the two spherical surfaces that gives rise to places having uncontrolled optical results, thereby giving rise to large areas of optical anomalies in the bottom side zones, where the transition variations are the greatest on either side of the meridian.

STATE OF THE ART

Conclusion

The defects of present-day progressive lenses are well known to all the leaders and multinationals present on the international optics markets (since these defects are described in detail in their patents and thus openly recognized). In conclusion, existing progressive lenses present well-identified significant common characteristic defects; significant defects that leave a margin in which it is possible to envisage advantageous improvements; this improvement margin is thus itself clearly also significant.

Professionals in optics usually use the term "Design" to designate each particular variation in optical power and astigmatism in progressive lenses; design thus serves to identify and distinguish by its optical result any one method of calculating and generating a progressive surface from another such method; design thus characterizes the results and the differences between the active brands in this field; design also serves to identify embodiment variants within a given brand, depending on the particular features applied to design.

In the present practice of the state of the art, each brand actively promotes, via publicity in the media, a plurality of distinct designs that it possesses, with the basic argument being that a given design is suitable for such-and-such material (and thus refractive index) rather than some other material, or such-and-such a range of basecurves or indeed such-and-such an addition value; in short, designs are anything but universal since they are optimized on a case-by-case basis for each application and combination of values of refractive indices, basecurves, and range of additions.

Optics professionals know what they usually refer to as "basecurves" (abbreviation BC); basecurves define and represent the appearance of the curvature of a lens (in fact not directly related to the radius of curvature, but rather the inverse of the radius). Thus, it is common practice to refer to a basecurve of 2, or 4, etc. Since it is the inverse of radius, the smaller the base value, the flatter the curvature of the lens.

In practice, each basecurve value corresponds to a range of diopters for which such a curvature can be used.

It is well known that a conventional progressive lens design operates and produces best performance only within a narrow range of basecurves and for a narrow combination of refractive index values and of addition values; optical results quickly become unusable on departing from the center of the optimum values for which the design is intended; this is one of the basic elements that motivates each manufacturer having a large quantity of designs on the market, these designs being diametrically opposite from any possibility of universal use.

Unlike the state of the art, the present invention proposes a novel design that has the feature of being finely optimized, producing optical results that are entirely comparable with the highest-quality progressive lenses presently put on sale, while also having the unique and novel ability to maintain these qualities of optimization unchanged over a wide range of the variables mentioned above. This design thus makes it possible to produce the looked-for optical powers for any progressive lens prescription, by acting on the entire surface of the lens to produce a well-controlled and virtually identical distribution of progression and optical power, with this being possible over a wide range of materials (and thus refractive indices), e.g. lying in the range 1.498 to 1.74 (values mentioned here in non-exhaustive manner), for a wide range of basecurve values, e.g. lying in the range 0.5 diopters to 10.5 diopters, and for any combination of addition values in the addition range 0.5 diopters to more than 3.5 diopters.

For wearers of eyeglasses having progressive lenses based on this design that presents exceptional "robustness" (where "robustness" is the usual word used by the person skilled in optics to characterize optical performance that is similar or unchanging independently of the application of one or more variables; it being understood that as a general rule the methods and results used in optics are not very robust, with this being due to the fact that optics is a science that is known for being a non-linear branch of physics, for the most part), and as a result a field of vision is obtained that is always finely optimized and virtually identical, independently of the applied above-mentioned variables (refractive indices, basecurves, and additions). This design with exceptional robustness thus eliminates the major obstacle of conventional lenses that present characteristics that are highly variable and strongly dependent on the selected materials and additions (thus including refractive index, and also the combination of refractive index, basecurves, and addition), of necessity suffering from major and troublesome defects of present-day progressive lenses which necessarily include large variations in zones of inappropriate optical power as a result of the way in which their surfaces are made.

To avoid these defects, the invention described herein generates the progressive surface distribution (i.e. the design) on bases that are totally novel, so as to ensure that the optical values of the progressive lenses are virtually identical, with this applying to any combination of the above-mentioned variables.

The invention thus proposes a progressive surface having a geometrical center, a positioning reference referred to as the "fit point" or "fitting cross" that may equally well be located at this geometrical center or any position value above that geometrical center, in opposition to and differing from conventional ophthalmic lenses (e.g. patent EP 1 744 202 A1).

Furthermore, the innovation of this design may be expressed in four embodiments, as specified in claims 2 to 5.

The basis of the design of such a quasi-universal progressive lens is founded initially on observing a large quantity of results calculated on an ultra-powerful computer, with the results and conclusions being unified in the following expression: imagine the horizontal line projected from the vision axis of the wearer of the eyeglasses, straight ahead through the far vision field of the lens: let (x=0 & y=+8)—refer to FIG. 08—; then sweep the following segments along this line respectively to the left and to the right of its central axis: from (x=−X/y=+8) to (x=+X/y=+8); by positioning these above-mentioned horizontal segments below the surface portion where the iso-astigmatism value reaches 0.5 diopters, a surface is thus obtained in which:

$$X \text{ in millimeters (mm)} = 40.45 - (7.272 * A)$$

to the left and to the right of the far vision reference point, where A represents the addition (i.e. the difference in power between the near vision portion and the far vision portion) for which the distribution of an iso-astigmatism surface remains substantially identical for any addition in the range 0.5 diopters to 4.00 diopters, and with this applying for a range of basecurves going from 0.5 diopters to 10.5 diopters, and for each given refractive index value.

Applying "manual optimization" to these results (which optimization could nevertheless be performed by computer), and by adjusting the resulting values, it is possible to further improve these results.

LIST OF DRAWINGS

FIG. 01: unifocal ophthalmic lens, optical power.

FIG. 02: unifocal ophthalmic lens, optical power and meridian.

FIG. 03: progressive multifocal ophthalmic lens, vision zones and meridian.

FIG. 04: progressive multifocal ophthalmic lens, near vision axis and meridian.

FIG. 05: progressive multifocal ophthalmic lens, vision zones with isometric values.

FIG. 06: bifocal ophthalmic lens with "step" or "staircase" vision zones between the near and far vision zones.

FIG. 07: progressive multifocal ophthalmic lens with recognition and identification of the positioning of the 0.5 diopter value of the iso-astigmatism curve situated below the "fit point" (fitting cross).

FIG. 08: progressive multifocal ophthalmic lens: various reference points (here with the "fit point" at 4 mm, by way of example).

The invention claimed is:

1. A series of progressive lenses, each having a progressive optical surface comprising:
   a geometrical center of millimetric coordinates x=0, y=0;
   a far vision portion which is located at the upper part of the lens, which has a far vision correction and which comprises a far vision reference point of millimetric coordinates x=0, y=+8;
   a near vision portion which is located at the lower part of the lens and which has a near vision correction; and
   an intermediate portion connecting the far vision and near vision portions, wherein
   the progressive optical surface of each progressive lens of the series has a power addition A which is defined as the power difference between the far vision and near vision portions and which is selected within a range of 0.50 diopters to 4.00 diopters, a basecurve selected within a range of 0.5 diopters to 10.5 diopters, and a refractive index selected within a range of at least 1.498 to 1.74, and wherein
   the progressive optical surface of each progressive lens of the series has astigmatism values not exceeding 0.5 diopters at least on a segment whose extremities thereof are defined by millimetric coordinates x=−X, y=+8 and x=+X, y=+8, with X=40.45−(7.272*A).

2. The series according to claim 1, wherein the progressive optical surface of each progressive lens of the series comprises a fit point which is located at or above the geometrical center.

3. The series according to claim 2, wherein the progressive optical surface of each progressive lens of the series comprises:
   a progression meridian which passes through the far vision, intermediate and near vision portions; and
   a progression length which is defined as being the distance along the y-axis between the fit point and a point of the progression meridian having a mean sphere value reaching 85% of the nominal value of the power addition, and which progression length is selected as being of the order of 10 mm, 12 mm, 13.5 mm, or 14.5 mm.

* * * * *